United States Patent [19]

Mason

[11] Patent Number: 4,650,208
[45] Date of Patent: Mar. 17, 1987

[54] INDEXABLE CASTER ADJUSTING PLATE FOR MOTOR VEHICLES

[75] Inventor: James L. Mason, Birmingham, Mich.

[73] Assignee: Ford Motor Company, Dearborn, Mich.

[21] Appl. No.: 686,562

[22] Filed: Dec. 26, 1984

[51] Int. Cl.⁴ .............................................. B62D 17/00
[52] U.S. Cl. ..................................... 280/661; 280/673
[58] Field of Search ...................... 280/96.1, 660, 661, 280/668, 673, 674

[56] References Cited

U.S. PATENT DOCUMENTS

| | | | |
|---|---|---|---|
| 1,363,477 | 12/1920 | Lowe | 280/673 |
| 2,065,071 | 12/1936 | Harris | 280/661 |
| 2,115,915 | 5/1938 | McCain | 280/661 |
| 2,122,961 | 7/1938 | Siebler | 280/661 |
| 2,556,767 | 6/1951 | McCann | 52/732 |
| 2,890,893 | 6/1959 | Laukhuff | 280/661 |
| 3,257,121 | 6/1966 | Muller | 280/661 |
| 3,285,622 | 11/1966 | Castoe | 280/661 |
| 3,819,202 | 6/1974 | Castoe | 280/661 |
| 3,880,444 | 4/1975 | Bridges | 280/661 |
| 4,011,626 | 3/1977 | Chandler | 16/240 |
| 4,213,631 | 7/1980 | Wilkerson | 280/661 |
| 4,418,938 | 12/1983 | Sullivan | 280/661 |
| 4,420,170 | 12/1983 | Wysocki | 280/661 |

OTHER PUBLICATIONS

Ford Motor Company Shop Manual for Light Trucks, pp. 19-01-2 and 19-01-9.

*Primary Examiner*—John J. Love
*Assistant Examiner*—Kenneth R. Rice
*Attorney, Agent, or Firm*—Jerome R. Drouillard; Roger L. May

[57] ABSTRACT

An indexable caster adjusting plate for use with a motor vehicle suspension including an axle, a wheel carrier pivoted to the axle, and a radius arm attached at its first end to the axle and at its second end to the chassis of the motor vehicle. The caster adjusting plate is used to change caster angle by rotating the axle and wheel carrier about a transverse axis a predetermined amount relative to the radius arm.

15 Claims, 4 Drawing Figures

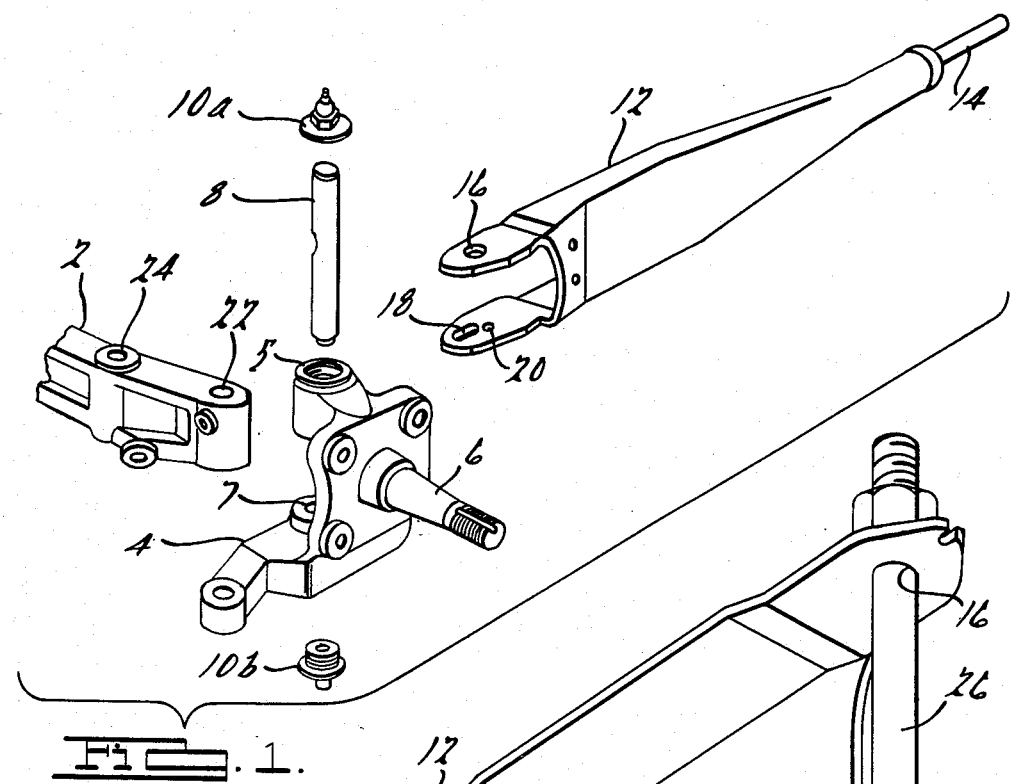
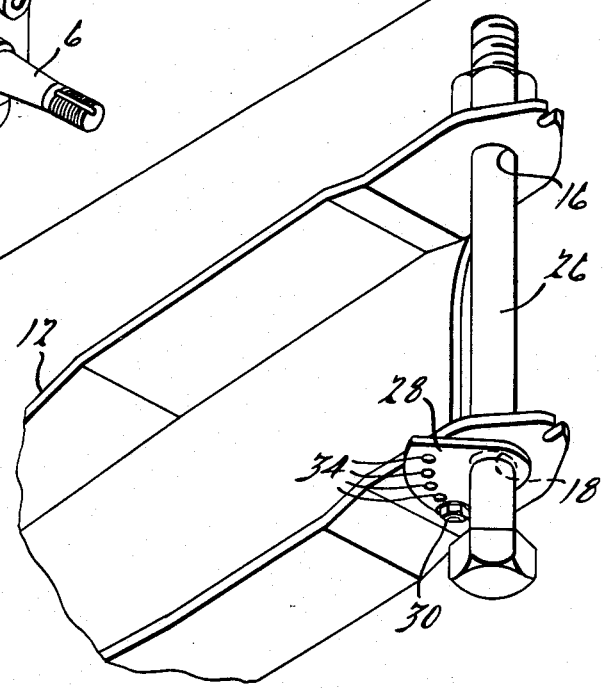
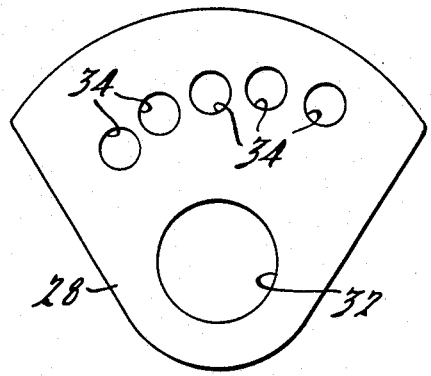
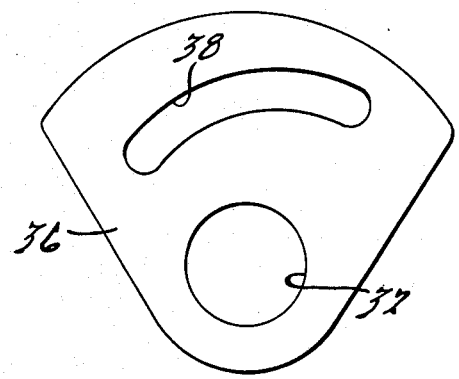

INDEXABLE CASTER ADJUSTING PLATE FOR MOTOR VEHICLES

BACKGROUND OF THE INVENTION

1. Field of the Invention

This invention relates to means for adjusting the caster angle of the steerable wheels of motor vehicles.

2. Description of Related Art

Automotive designers have incorporated various means for adjusting the suspension parameters caster, camber, and toe. The present invention is concerned with the adjustment of caster on monobeam, twin-I-beam or other front axles. Caster angle is the angle included between a vertical plane passing through the wheel spindle and a line passing through and concentric with the longitudinal center line of the kingpin. Caster angle is measured in a vertical plane running parallel to the longitudinal center line of the vehicle.

Caster and camber adjustments may be performed by means of similar mechanisms with some automotive suspensions and several different types of devices have been used to adjust one or both of these parameters. U.S. Pat. No. 4,213,631 discloses an indexable plate for independently or simultaneously changing the caster and camber angles of the front wheels of a vehicle having a single axis suspension device such a a McPherson strut. Some suspensions have incorporated adjustable links for the purpose of changing caster or camber. Examples of these are disclosed in U.S. Pat. No. 2,115,915 which illustrates the use of turnbuckles and U.S. Pat. No. 3,819,202, which incorporates an adjustable strut between the wheel carrier and a vehicle cross member. Various systems have been used for changing caster and camber through adjustment of slotted devices. U.S. Pat. Nos. 2,065,071, 2,122,961, 3,285,622, 4,011,626, 4,418,938, and 4,420,170 all disclose means of this type. Ford Motor Company's 1984 model truck shop manual for light trucks at pages 19-01-2 and 19-01-9 discloses a method for adjusting caster angle using only the available clearances provided by the mounting holes for a fastener which connects the axle to the radius arm. A similar method involves manually slotting a mounting hole in a radius arm to achieve an equivalent result.

Devices incorporating cams have also proven useful for adjusting automotive suspensions. Examples of such devices are disclosed in U.S. Pat. Nos. 2,556,767, 2,890,893 and 3,880,444.

Caster angle is important in vehicle suspensions because it is the caster adjustment which provides part of the tendency of the vehicle's wheels to return to a straight ahead position following negotiation of a curve. A side-to-side difference in caster angle can cause the vehicle to drift or pull in one direction. The indexable caster adjusting plate of the present invention is useful for correcting this side-to-side variation in caster angle.

SUMMARY OF THE DISCLOSURE

The indexable caster adjusting plate of the present invention may be employed with a motor vehicle suspension including an axle, a wheel carrier pivoted to the axle, and a radius arm attached at its first end to the axle and at its second end to the chassis of the motor vehicle. The caster adjusting plate of the present invention can be used to rotate the axle and wheel carrier about a transverse axis a predetermined amount relative to the radius arm. This relative rotation will cause adjustment of the caster angle of the suspension. Those skilled in the art will appreciate that this result flows from the fact that the radius arm restrains the axle from rotating about its own longitudinal axis.

BRIEF DESCRIPTION OF THE DRAWINGS

FIG. 1 is an exploded perspective view of an automotive axle suitable for incorporation of the indexable caster adjusting plate of the present invention.

FIG. 2 is a perspective view of the radius arm included in the axle of FIG. 1 showing the mounting position of the indexable caster adjusting plate of this invention.

FIG. 3 is a plan view of one form of the caster adjusting plate of the present invention.

FIG. 4 is a plan view of a second form of the caster adjusting plate of the present invention.

DETAILED DESCRIPTION OF THE PREFERRED EMBODIMENTS

As shown in the Figures, the caster adjusting plate of the present invention is suited for use with a suspension including axle beam 2 to which wheel carrier 4 is pivotally mounted. Wheel carrier 4 includes a spindle 6 upon which a wheel and tire assembly may be rotatably mounted. Kingpin 8 passes through kingpin bores 5 and 7 in wheel carrier 4 as well as through bore 22 contained in axle 2 and thus secures wheel carrier 4 to the balance of the axle assembly. Plugs 10a and 10b are mounted in wheel carrier 4, at either end of kingpin 8. Radius arm 12 is mounted at its first end to axle 2 and at its second end to the chassis of the motor vehicle. Radius arm 12 is mounted to the chassis by means of stem 14 which is threaded.

The first end of radius arm 12 is bifurcated and each member produced by the bifurcation contains an aperture through which a fastener passing through bore 24 in axis beam 2 may secure radius arm 12 to axle beam 2. These are apertures 16, contained in the upper bifurcation member, which is attached to the upper half of the axle, and aperture 18, contained in the lower bifurcation member, which is attached to the lower half of the axle. Aperture 18 is a longitudinal slot with its major axis running parallel to the longitudinal axis of the vehicle. Radius arm 12 also contains auxiliary aperture 20 through which fastener 30 (FIG. 2) extends to secure indexable caster adjusting plate 28 (FIG. 2) to radius arm 12 in the desired location.

As shown in FIG. 2, nut and bolt 26 is used to secure radius arm 12 to axle beam 2. The bolt passes through bore 24 contained in axle beam 2. Indexable caster adjusting plate 28 contains a central aperture 32 for bolt 26 and a plurality of secondary apertures 34. Each secondary aperture lies a different distance from central aperture 32. By selecting the proper secondary aperture 34, central aperture 32 will be indexed at the desired location along aperture 18 and bolt 26 will therefore be positioned so as to set the caster angle as required. This result depends upon the fact that one function of the radius arm is to act as a moment arm for controlling the axle's caster angle; the indexable caster adjusting plate of the present invention assists the radius arm in maintaining the axle at the desired caster setting.

As shown in FIG. 4, secondary apertures 34 may be replaced by an arcuate slot 38 sized to accept auxiliary fastener 30, with the slot curving away from central aperture 32 so that caster may be adjusted by merely rotating caster adjusting plate 38 to the desired position and locking auxiliary fastener 30.

Referring once again to the definition of caster angle, the caster adjusting plate described herein determines the caster angle of the suspension to which it has been applied by fixing the angle, projected in a vertical plane lying parallel to the vehicle's center line, included between the axle's kingpin axis and the longitudinal axis of the radius arm. As will be apparent, changing the angle between the radius arm and the kingpin axis will alter the caster angle in the manner described herein.

It will be understood that the invention is not to be limited to the exact construction shown and described, and that various changes and modifications may be made without departing from the spirit and scope of the invention as defined in the appended claims.

I claim:

1. In a motor vehicle suspension including an axle, a wheel carrier pivoted to said axle, and a radius arm attached at its first end to said axle and at its second end to the chassis of said motor vehicle, with said first end of said radius arm being bifurcated, with each member of said bifurcation containing an aperture for a fastener extending through said aperture into said axle, and wherein one member of said bifurcation is attached to the upper half of said axle and the other member of said bifurcation is attached to the lower half of said axle, the improvement comprising a caster adjusting plate attached to one of said members of said bifurcation, with said caster adjusting plate including an aperture for said fastener extending into said axle, said caster adjusting plate comprising means for rotating said axle and said wheel carrier about a transverse axis a predetermined amount relative to said first end of said radius arm, whereby the caster angle of said suspension will be adjusted.

2. The motor vehicle suspension of claim 1 wherein the aperture of that member to which said caster adjusting plate is attached comprises a longitudinal slot having its major axis generally parallel to the longitudinal centerline of the vehicle.

3. The motor vehicle suspension of claim 2 wherein said castor adjusting plate and said member of said bifurcation further comprise means for positioning said caster adjusting plate such that said aperture in said plate may be fixed at a desired location along said longitudinal slot formed in said member.

4. The motor vehicle suspension of claim 3 wherein said means for positioning said caster adjusting plate comprises a arcuate slot formed in said caster adjusting plate in combination with an auxiliary fastener passing through said slot into said member of said bifurcation, thereby securing said caster adjusting plate to said member.

5. The motor vehicle suspension of claim 3 wherein said means for positioning said caster adjusting plate comprises a plurality of secondary apertures contained in said caster adjusting plate through which apertures an auxiliary fastener may be placed in order to indexably secure said caster adjusting plate to said member.

6. The motor vehicle suspension of claim 5 wherein each of said secondary apertures are different distance from said aperture for said fastener extending into said axle.

7. A motor vehicle suspension comprising:
a transverse axle;
a wheel carrier pivoted to said axle;
a radius arm having a bifurcation at its axle end with one member of said bifurcation attached to the top of said axle and the other member attached to the bottom of said axle; and
a caster adjusting plate attached to one of said members of said bifurcation so as to determine the caster angle of said suspension by fixing the angle, projected in a vertical plane lying parallel to the vehicle's centerline, included between said axle's king pin axis and the longitudinal axis of said radius arm.

8. The motor vehicle suspension of claim 7 wherein said members of said bifurcation each include an aperture through which a fastener may extend into said axle.

9. The motor vehicle suspension of claim 8 wherein one of said apertures comprises a slot oriented with its longitudinal axis parallel, in plan view, to the longitudinal centerline of the vehicle.

10. The motor vehicle suspension of claim 8 wherein said caster adjusting plate comprises a central aperture through which a fastener may be extended into said slot in said radius arm and then into said axle.

11. The motor vehicle suspension of claim 10 wherein said caster adjusting plate further comprises means for adjusting said plate so as to shift the position of said central aperture along said slot in said radius arm.

12. The motor vehicle suspension of claim 11 wherein said means for adjusting said caster adjusting plate comprises an arcuate slot within said plate, characterized in that the distance from said arcuate slot to said central aperture varies along the length of said arcuate slot.

13. The motor vehicle suspension of claim 12 wherein said means for adjusting said caster adjusting plate further comprises an auxiliary fastener extending through said arcuate slot and fixing said plate to said radius arm.

14. The motor vehicle suspension of claim 11 wherein said means for adjusting said caster adjusting plate comprises a plurality of secondary apertures formed in said plate, each such secondary aperture being further characterized in that the distances from each of said apertures to said central aperture differ.

15. The motor vehicle suspension of claim 14 wherein said secondary apertures are engaged by one or more auxiliary fasteners extending into said radius arm at fixed locations, so as to indexably secure said adjusting plate to said radius arm.

* * * * *